Sept. 29, 1925.
V. P. HUMMEL
SHOCK ABSORBER
Filed May 2, 1924
1,555,671
3 Sheets-Sheet 1
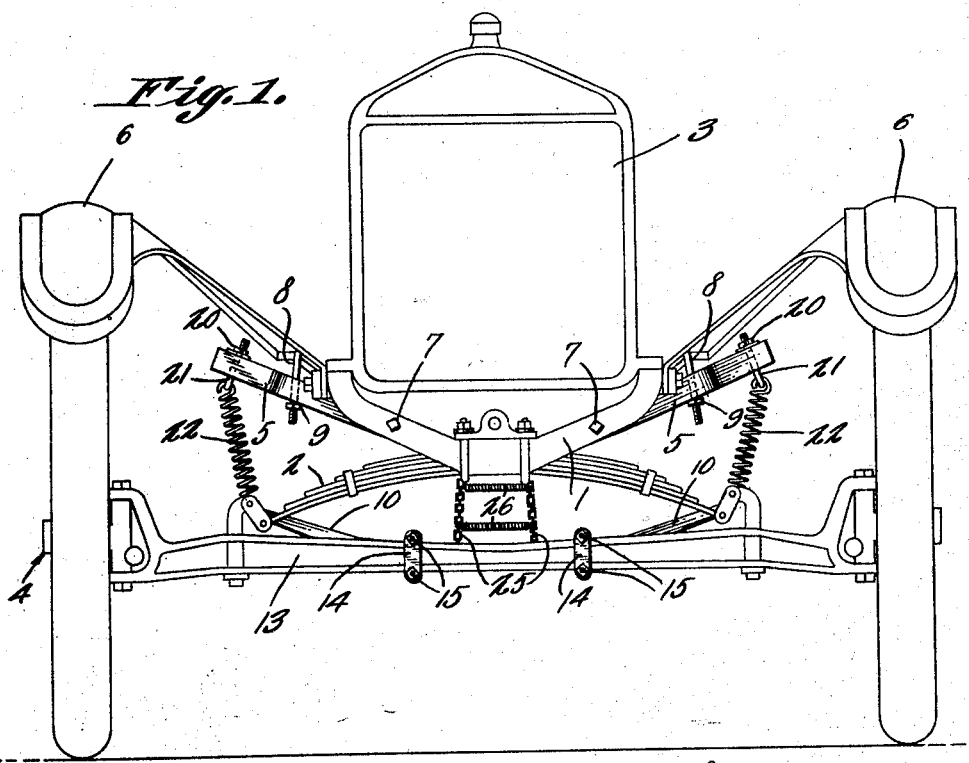
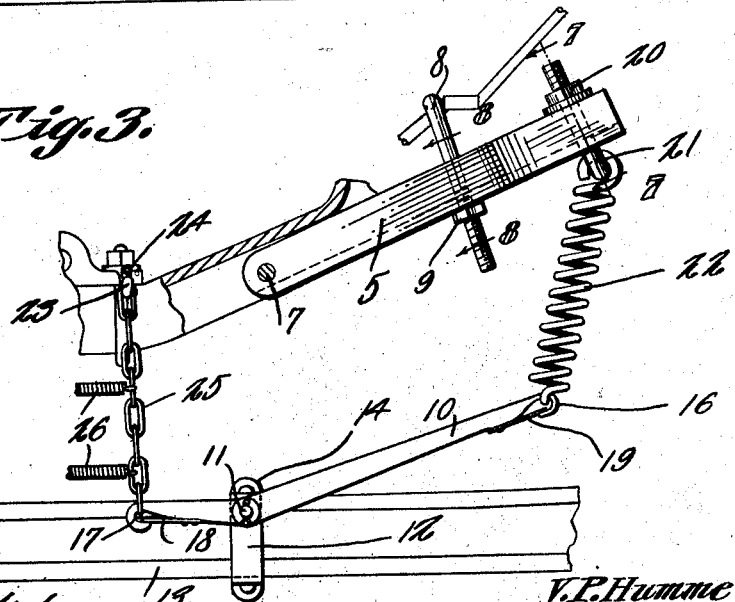

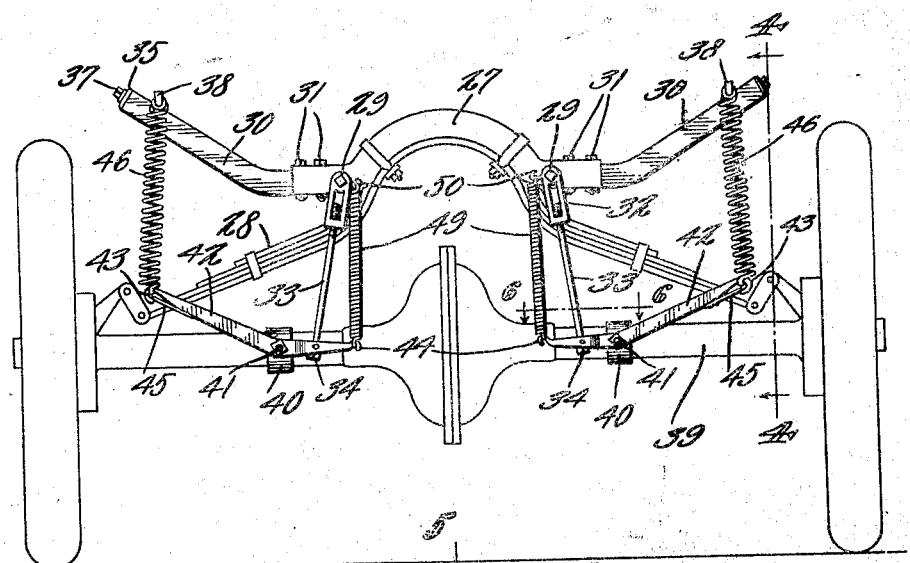
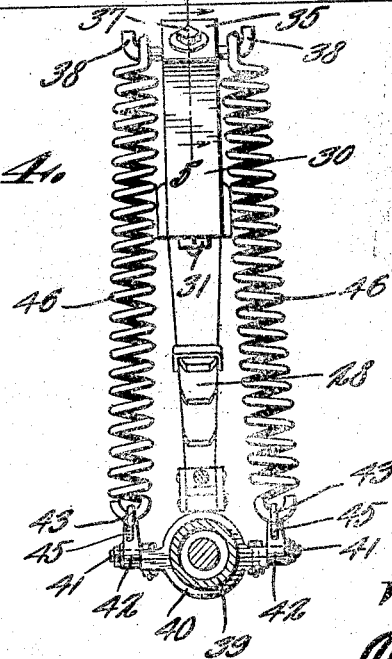

Sept. 29, 1925.  1,555,671
V. P. HUMMEL
SHOCK ABSORBER
Filed May 2, 1924   3 Sheets-Sheet 3
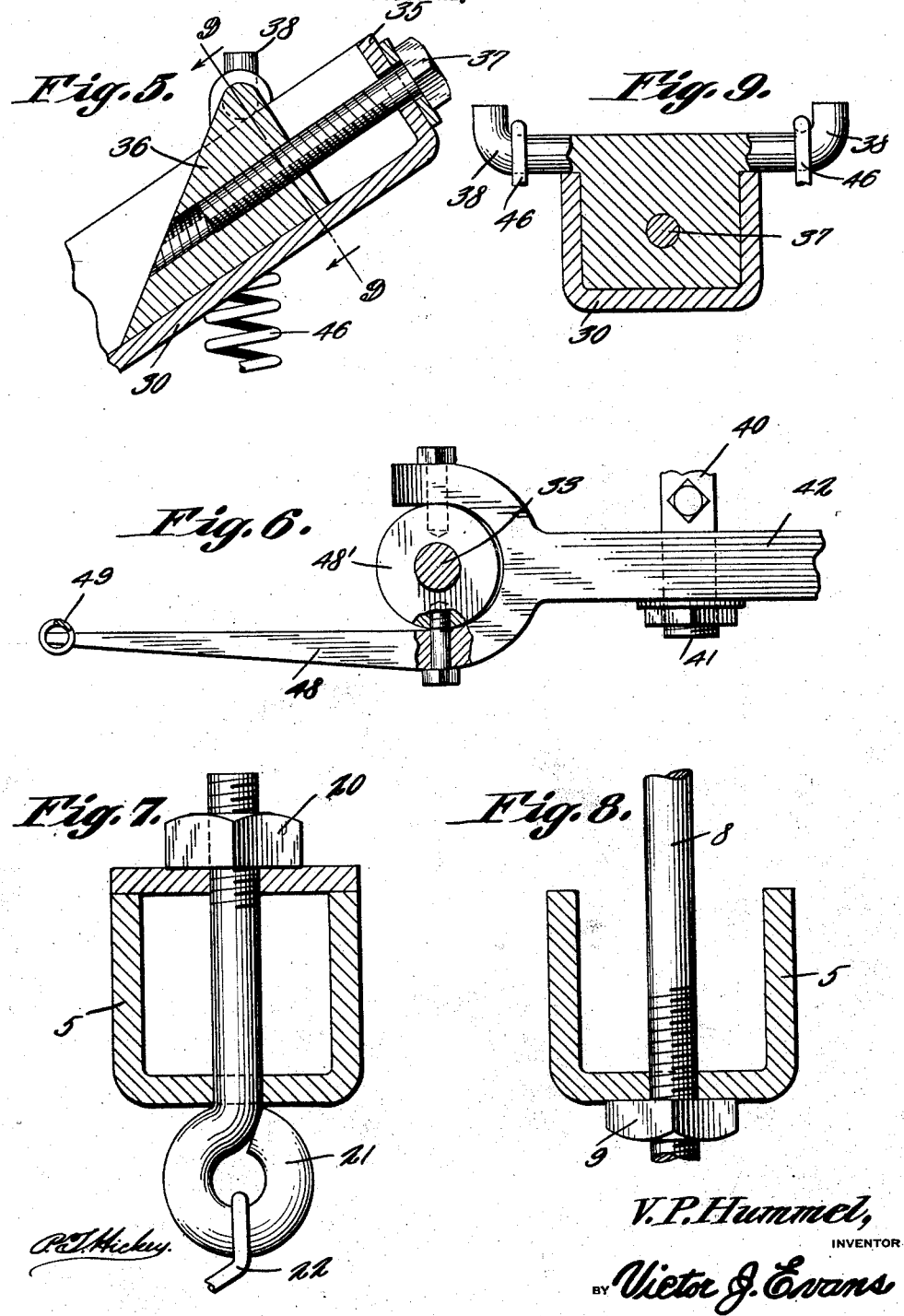

Patented Sept. 29, 1925.

1,555,671

UNITED STATES PATENT OFFICE.

VALENTINE P. HUMMEL, OF TRAMPING LAKE, SASKATCHEWAN, CANADA.

SHOCK ABSORBER.

Application filed May 2, 1924. Serial No. 710,663.

*To all whom it may concern:*

Be it known that I, VALENTINE P. HUMMEL, a subject of the King of Great Britain, residing at Tramping Lake, in the Province of Saskatchewan and Dominion of Canada, have invented new and useful Improvements in Shock Absorbers, of which the following is a specification.

The object of this invention is the production of means for checking the rebound of springs for automobiles or similar vehicles, and to likewise cause a partial expansion of said springs so that the vehicle will ride as easily when unloaded as when loaded.

With the above broadly stated object in view, and others which will appear as the nature of the invention is better understood, reference is to be had to the drawings which accompany and which form part of this application, and wherein:—

Figure 1 is a front elevation of an automobile provided with the improvement.

Figure 2 is a rear elevation thereof.

Figure 3 is a longitudinal sectional view through the improvement as arranged upon the front of the automobile.

Figure 4 is a similar sectional view through the improvement arranged upon the rear of the automobile.

Figure 5 is a sectional view on the line 5—5 of Figure 4.

Figure 6 is a sectional view on the line 6—6 of Figure 2.

Figure 7 is a sectional view on the line 7—7 of Figure 3.

Figure 8 is a sectional view on the line 8—8 of Figure 3.

Figure 9 is a sectional view on the line 9—9 of Figure 5.

In the channeled member 1 that supports the front springs 2 and likewise the radiator 3 of an automobile 4, I secure bars 5 respectively. These bars are also preferably in the nature of channeled irons and each of the said bars is extended laterally from the sides of the machine and disposed at an upward angle with respect thereto. The bars underlie the front fenders or mudguards 6 of the machine, but have their outer ends disposed a suitable distance therebelow. Securing means 7 pass through the channeled members 1 of the automobile frame and through the bars, while other securing means, preferably in the nature of threaded hooks 8 pass through the mudguards 6 and through the bars 5. The threaded shanks of the members 8 are engaged by nuts 9, and as the connecting elements 7 in reality provide pivots between the bars and the frame member 1, the said bars may be adjusted on the automobile frame by the adjustment of the nuts 9 on the members 8.

The respective bars 5 are arranged directly above the spring 2 at the front of the automobile and are also arranged directly above levers 10 which are pivotally secured in trunnions 11 provided upon the inner elements of substantially U-shaped clamps 12. These clamps have their parallel arms straddling the front axle 13 of the automobile, and the said arms preferably have their outer ends rounded and threaded to receive thereon a plate 14. The plate is secured on the clamp by nuts 15 engaging the said threaded ends of the arms of the clamp. Each of the levers 10 has both of its ends formed with hooks 16 and 17 and has secured thereto a flat spring 18 and 19 which close the mouths of the hooks.

On the outer end of each of the bars 5 there is adjustably secured by means 20 an eye member 21. Each of there eyes engages one of the ends of a comparatively heavy helical spring 22, the opposite ends of the said springs being engaged by the hooks 16 on the outer and upwardly inclined ends of the levers 10. The means that secure the front spring 2 in the frame member 1 may have attached thereto hooks 23 whose beaks or mouths are closed by flat springs 24. These hooks engage flexible elements, preferably in the nature of chains 25. The second and lower end of each chain engages in the inner hook 17 of the respective levers 10. The flexible elements 25 are connected together by cross springs 26 to prevent the rattling thereof. The springs 22 have a tendency to draw the frame of the automobile toward the front axle 13 thereof, consequently partly expanding the spring 2. The rebound from any shocks and jars to which the front of the automobile is subjected will be compensated for by the springs 22, the flexible elements 25 serving to limit the swinging of the levers by the influence of the springs, and also serving as guides in the swinging movement of the levers.

In the channeled member 27 and secured to the rear of the body of the automobile which also receives therein the rear spring 28 of the machine, I secure, by pivots 29, channeled bars 30. In addition to the pivots, bolt members 31, engaged by suitable nuts, pass through the frame member 27 and the bars 30. The nuts on these elements being adjustable, permit of the swinging of the bars on the said frame member. In this connection it should be stated that by adjusting the nuts 9 on the members 8 the tension of the springs 22 may be regulated without necessitating the adjustment of the means 20. This is also true with respect to the spring attached to the bars 30, as will presently be apparent.

The pivots 29 extend a suitable distance through the sides of the channeled member 27, and support thereon yokes 32. Two yokes are thus supported on each pivot. Each of the yokes has its outer element provided with a threaded opening and in this opening there is screwed a rod 33, the outer end of the rod being headed, as at 34.

Received in and also arranged on the sides of the angle outer ends 35 of the channeled bars 30 there are what I will term saddle members 36. The outer ends of the channeled bars 30 are closed but have an opening therethrough, and through this opening there is passed the shank of a headed bolt 37. This bolt is received in a central threaded opening in each of the saddle members 36, and by adjusting the bolts it will be noted that the saddle members may be moved toward or away from the outer ends of the bars 30. The saddle members 36 have on their outer sides hooks 38 for a purpose which will presently be apparent.

Secured on the rear axle housing 39 of the automobile there are two-part clamping members 40. Each of the clamps 40 has its sides provided with outwardly extending trunnions 41, the ends of which being threaded. Pivotally mounted on each trunnion 41 there is the central portion of an angle lever 42. The angle levers 42 are substantially similar to the angle levers 10, each of the same having their ends formed with hooks 43 and 44 respectively, the outer hook 43 being closed by a flat spring 45. The hooked ends 43 of the levers are disposed directly below the hooks 38 on the saddle members 36, and secured to these hooks there are the ends of comparatively heavy helical springs 46. The levers 42 have their straight inner ends, at a suitable distance inward of their hooks 44 bifurcated or formed on preferably their inner faces with a spaced arm 47, and pivoted between the outer side of each of the said levers and the arms 48 there is a bearing eye 48' through which the rods 33 pass. The hooks 44, on the inner ends of the levers 42 are engaged by comparatively light springs 49, the said springs also engaging hooks 50 formed on the inner sides of the yokes 32.

The springs 46 are of materially greater strength than the single springs 42, but serve for the same purpose, that is, the springs will draw the body of the vehicle toward the rear axle thereof so as to spread the rear spring 28, and likewise absorb any recoil to which the rear of the machine is subjected incident to shocks and jars.

My improvement is of a comparatively simple construction which may be cheaply manufactured and easily attached to an ordinary well-known class of automobiles. It is thought that the above description, when taken in connection with the drawings will amply set forth the invention and its advantages. However, I do not desire to be restricted to the precise structural features herein disclosed but hold myself entitled to such changes therefrom as fairly fall within the scope of what I claim.

Having described the invention, I claim:—

1. In a device for the purpose set forth, the combination with an automobile, of bars having outer angle ends pivotally secured to the frame thereof above the axles therefor, adjustable means engaging the bars for holding the same from swinging on their pivots in one direction, levers having outer angle ends pivotally secured to the axles of the machine, springs removably secured to the outer ends of the levers and bars, means adjusting the tension of said springs, and yieldable means limiting the swinging of the levers in one direction.

2. In a device for the purpose set forth, the combination with an automobile, of bars having outer angle ends pivotally secured to the frame thereof above the axles therefor, adjustable means engaging the bars for holding the same from swinging on their pivots in one direction, levers having outer angle ends pivotally secured to the axles of the machine, springs removably secured to the outer ends of the levers and bars, means adjusting the tension of said springs, yieldable means limiting the swinging of the levers in one direction, and means for adjusting said last mentioned means.

3. In a device for the purpose set forth, the combination with an automobile, of bars having outer angle ends pivotally secured to the frame thereof above the axles therefor, adjustable means engaging the bars for holding the same from swinging on their pivots in one direction, levers having outer angle ends pivotally secured to the axles of the levers and bars, means adjusting the tension of said springs, and movable and adjustable means limiting the swinging of the levers by the influence of the springs.

In testimony whereof I affix my signature.

VALENTINE P. HUMMEL.